US012601757B2

(12) United States Patent
Lee et al.

(10) Patent No.: US 12,601,757 B2
(45) Date of Patent: Apr. 14, 2026

(54) ULTRA-MICRO ELECTRODE FOR ELECTROCHEMICAL ANALYSIS AND METHOD OF MANUFACTURING THE SAME

(71) Applicant: DONG-A UNIVERSITY RESEARCH FOUNDATION FOR INDUSTRY-ACADEMY COOPERATION, Busan (KR)

(72) Inventors: Hyo Jong Lee, Busan (KR); Jung Han Kim, Changwon-si (KR); Young Jun Cho, Busan (KR); Han Kyun Shin, Changwon-si (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 385 days.

(21) Appl. No.: 18/504,720

(22) Filed: Nov. 8, 2023

(65) Prior Publication Data

US 2025/0125072 A1 Apr. 17, 2025

(30) Foreign Application Priority Data

Oct. 16, 2023 (KR) ........................ 10-2023-0137686

(51) Int. Cl.
*G01Q 60/60* (2010.01)
(52) U.S. Cl.
CPC .................................. *G01Q 60/60* (2013.01)

(58) Field of Classification Search
USPC ........................................................ 850/51
See application file for complete search history.

(56) References Cited

U.S. PATENT DOCUMENTS

2014/0262433 A1* 9/2014 Lim ...................... G01Q 70/12
174/126.1
2018/0067075 A1* 3/2018 Racz ...................... C25D 13/20

FOREIGN PATENT DOCUMENTS

JP 6095105 B2 3/2017
KR 10-2012-0039310 2/2012

* cited by examiner

*Primary Examiner* — Kiet T Nguyen
(74) *Attorney, Agent, or Firm* — NSIP Law

(57) ABSTRACT

An ultra-micro electrode that performs electrochemical analysis and a method of manufacturing the same is provided. The method includes preparing an insulating member having a capillary shape with a hollow region, preparing a conductive wire including a conductive material with an oxidation resistance greater than an oxidation resistance of copper, inserting the conductive wire into the hollow region of the insulating member, manufacturing half-finished products by applying heat and an external force to the insulating member having the conductive wire inserted therein to stretch the insulating member and the conductive wire so that a central portion of the insulating member is thin and the insulating member and the conductive wire are ruptured at central portions thereof, forming a groove by etching the conductive wire located on a ruptured surface of each half-finished product, and forming a filling layer by filling the groove with a conductive material by a plating process.

12 Claims, 14 Drawing Sheets

H

G

100

ULTRA-MICRO ELECTRODE FOR ELECTROCHEMICAL ANALYSIS AND METHOD OF MANUFACTURING THE SAME

CROSS-REFERENCE TO RELATED APPLICATIONS

This application claims the benefit under 35 USC § 119 (a) of Korean Patent Application No. 10-2023-0137686, filed on Oct. 16, 2023, in the Korean Intellectual Property Office, the entire disclosure of which is incorporated herein by reference for all purposes.

BACKGROUND

1. Field

The following description relates to an ultra-micro electrode with electrochemical analysis, which can be used not only as an electrode for a scanning electrochemical microscope, but also as a specimen that performs micro-surface analysis using a scanning electrochemical microscope; and to a method of manufacturing the same.

2. Description of the Related Art

With the recent advances in electrode technology, the implementation of electrochemical processes using a scanning electrochemical microscope has increased.

The scanning electrochemical microscope not only has excellent spatial resolution by using an ultra-micro electrode, but can also quantitatively measure local electrical activity based on the shape of the ultra-micro electrode.

With regard to the electrochemical reactions of various materials using the scanning electrochemical microscope, in order to understand new electrochemical behavior, it is important to measure precise and highly localized electrochemical reactions, which in turn leads to a need for ultra-micro electrodes with a smaller diameter.

The ultra-micro electrode may be used not only as a probe tip for a scanning electrochemical microscope, but it may also be used as a measurement specimen for the scanning electrochemical microscope.

As illustrated in FIG. 17, a typical ultra-micro electrode 23 may be manufactured in the following manner.

First, tension forces are applied to opposite ends of a glass tube 21 having a conductive wire 22 inserted therein, and a central portion of the glass tube 21 is heated using, for example, a laser, etc. to form a necking portion at a central portion. After that, tension forces are additionally applied under application of heat using, for example, a laser, etc., so that the conductive wire 22 and the glass tube 21 are brought into close contact and ruptured at central portions thereof.

Here, as the central portion of the glass tube 21 where the necking is formed is heated and the temperature of the conductive wire 22 located at the central portion increases to near the melting point, coarse crystal grains may be formed on the surface of the conductive wire 22 located at the central portion of the glass tube 21 or oxidation of the conductive wire 22 may be intensified. This makes it difficult to use the ultra-micro electrode 23 as a substrate to analyze fine crystal grains when using it as a measurement substrate.

Moreover, when the diameter of the conductive wire 22 becomes too small in order to manufacture an ultra-micro electrode with a smaller diameter, the oxidation of the conductive wire 22 described above may be further intensified, causing the conductive wire 22 to be brittle.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method of manufacturing an ultra-micro electrode to perform electrochemical analysis includes preparing an insulating member which has a capillary shape with a hollow region formed along a longitudinal direction thereof; preparing a conductive wire formed of a conductive material which has an oxidation resistance that is greater than an oxidation resistance of copper; inserting the conductive wire into the hollow region of the insulating member; manufacturing half-finished products by applying heat and an external force to the insulating member which has the conductive wire inserted therein to stretch the insulating member and the conductive wire so that a central portion of the insulating member is made thin and the insulating member and the conductive wire are ruptured at central portions thereof; forming a groove that has a predetermined depth by etching the conductive wire located on a ruptured surface of each half-finished product; and forming a filling layer by filling the groove with a conductive material by a plating process.

The preparing of the conductive wire may include forming the conductive wire with a material that contains at least one of nickel and chromium, and has an oxidation resistance that is greater than an oxidation resistance of copper.

The preparing of the conductive wire may include forming the conductive wire with stainless steel containing at least one of nickel and chromium.

The preparing of the conductive wire may include forming the conductive wire with a diameter greater than 0 μm and less than an inner diameter of the insulating member.

The diameter of the conductive wire may be equal to or less than 25 μm.

The forming of the filling layer may include preparing a plating solution; immersing each of the half-finished products in the plating solution; and performing the plating process to form the filling layer inside the groove of each of the half-finished products.

The performing of the plating process may form the filling layer by applying a voltage to the plating solution in which each of the half-finished products is immersed so that an inner surface of the half-finished product where the groove is formed is plated.

The method may include polishing the ruptured surface of the half-finished product after the manufacturing of the half-finished product and before the forming of the groove; and polishing a surface of the manufactured ultra-micro electrode where the filling layer is formed after the performing of the plating process.

The preparing of the plating solution may be performed by prepare the plating solution to contain ions of the conductive material including at least one of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), and lead (Pb).

The insulating member may be prepared to comprise at least one of borosilicate glass, silicon oxide, silicon nitride, and quartz.

In a general aspect, an ultra-micro electrode that preforms electrochemical analysis, the ultra-micro electrode includes an insulating member which has a capillary shape with a hollow region formed along a longitudinal direction thereof; a conductive wire formed of a conductive material which has an oxidation resistance that is greater than an oxidation resistance of copper, and inserted into the hollow region to form a groove with a predetermined depth at an end of the insulating member; and a filling layer formed in an area corresponding to the groove, and formed at the end of the insulating member, wherein the filling layer is formed with a conductive material.

The filling layer may be comprised of any one of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), lead (Pb), and an alloy obtained by combining at least two of these metals.

Other features and examples will be apparent from the following detailed description, the drawings, and the claims.

Figure 1:
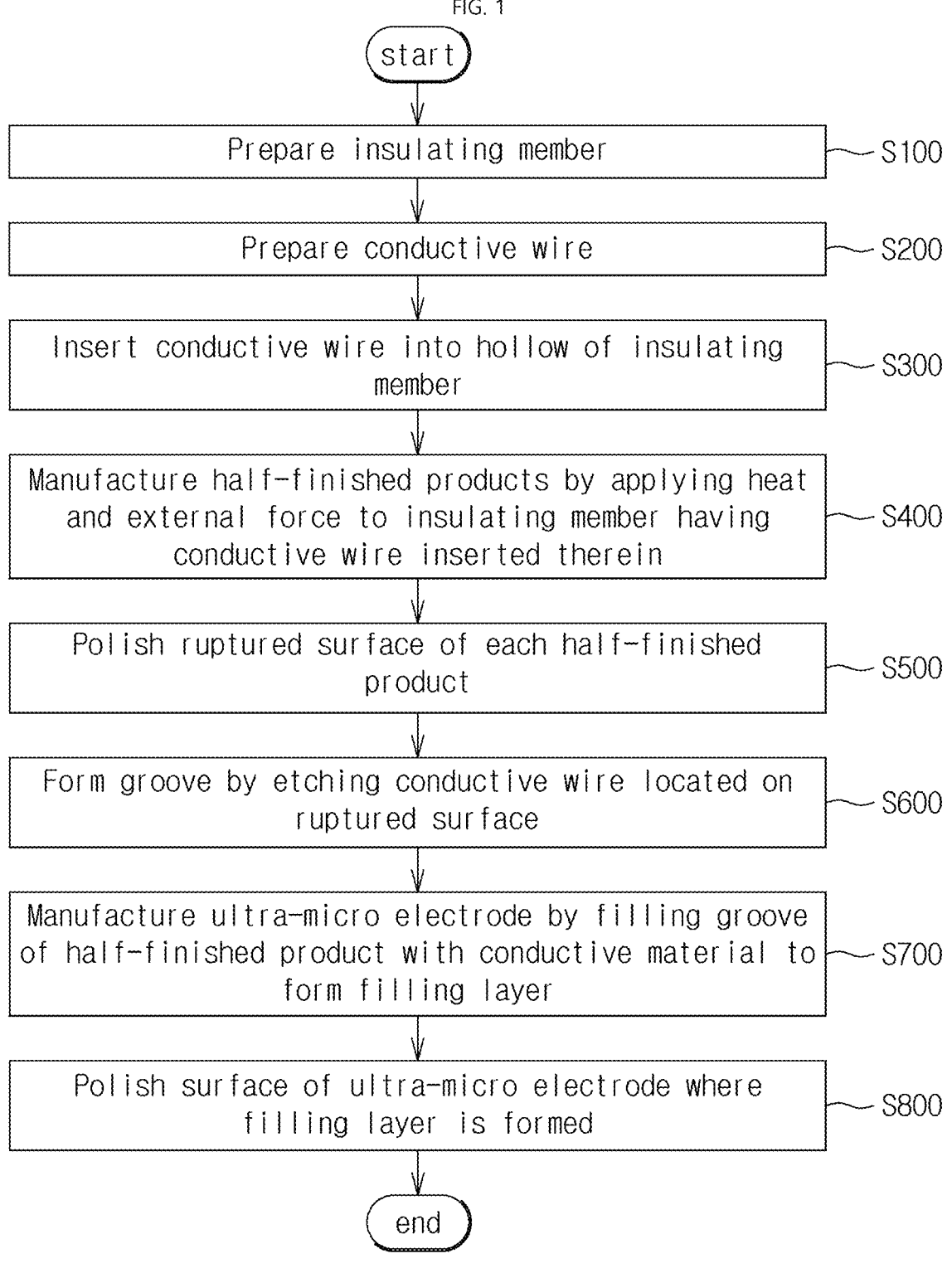
FIG. 1 is a flowchart illustrating the sequence of a method of manufacturing an example ultra-micro electrode with electrochemical analysis, in accordance with one or more embodiments.
Figure 2:
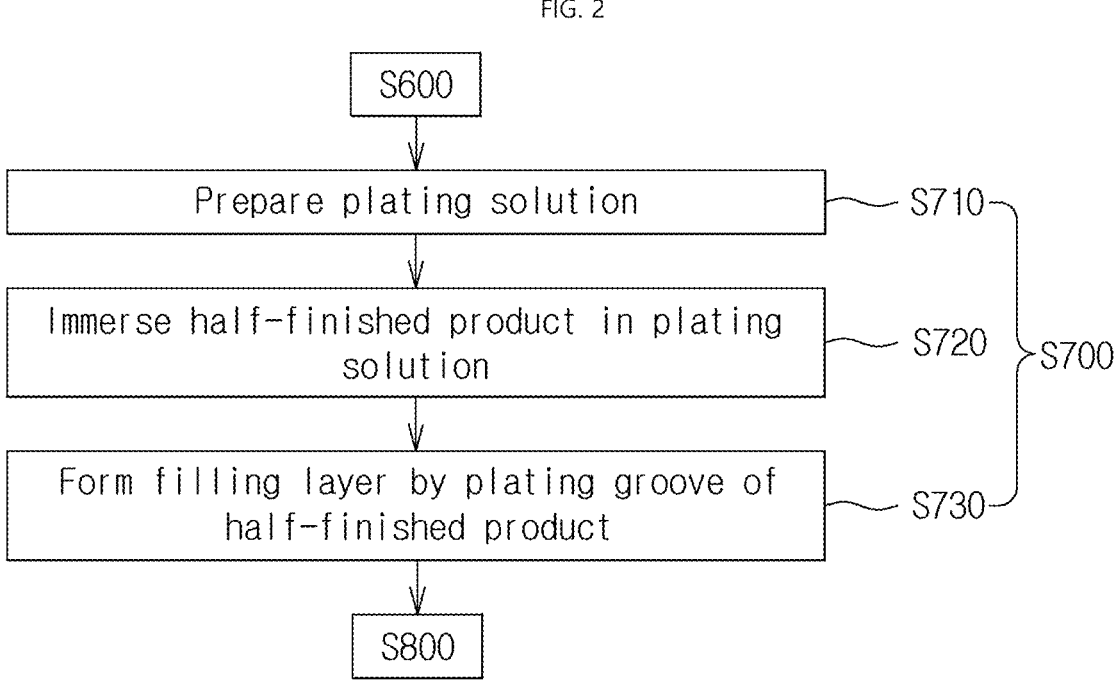
FIG. 2 is a flowchart showing the sequence of a filling operation in the method of manufacturing the example ultra-micro electrode with electrochemical analysis, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

One or more examples provide an ultra-micro electrode with electrochemical analysis, which has a filling layer that is formed by plating, so that it can be used not only as a probe tip for a scanning electrochemical microscope probe, but also as a specimen for analyzing fine crystal grains; and to provide a method of manufacturing the same.

In one or more examples, by etching a surface of a conductive wire with coarse crystal grains exposed at a central portion of the electrode and then forming a conductive filling layer by plating, the type of material that constitutes the filling layer can be changed as necessary, and a filling layer with fine crystal grains can be formed. Thus, it is possible to increase the usability of the electrode according to the present disclosure as a specimen for the scanning electrochemical microscope.

Hereinafter, an ultra-micro electrode that performs electrochemical analysis and a method of manufacturing the same, in accordance with one or more embodiments, will be described with reference to the accompanying drawings.

In describing the ultra-micro electrode for electrochemical analysis and the method of manufacturing the same, in accordance with one or more embodiments, substantially the same elements are described with identical reference numerals, and repeated descriptions are omitted for convenience of explanation.

A method of manufacturing an ultra-micro electrode for electrochemical analysis, in accordance with one or more embodiments, is a method for manufacturing an ultra-micro electrode 10 (FIG. 3) for electrochemical analysis, in accordance with one or more embodiments, and includes an insulating member preparation operation S100, a conductive wire preparation operation S200, an insertion operation S300, a half-finished product manufacturing operation S400, an etching operation S600, and a filling operation S700.

Figure 3:
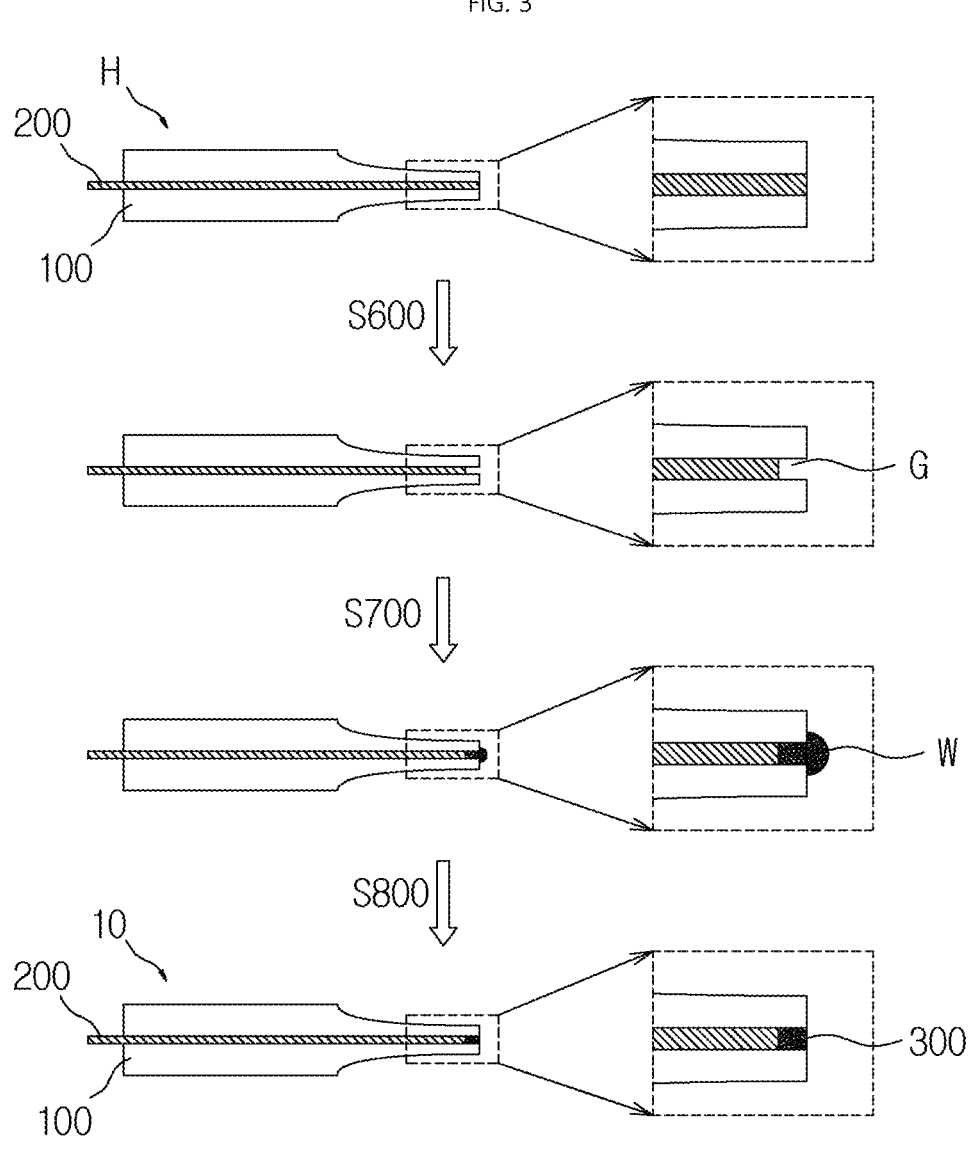
FIG. 3 is a view illustrating the method of manufacturing the example ultra-micro electrode with electrochemical analysis, in accordance with one or more embodiments.

Referring to FIG. 3, the ultra-micro electrode 10 for electrochemical analysis, in accordance with one or more embodiments, includes an insulating member 100, a conductive wire 200, and a filling layer 300.

The insulating member 100 has a capillary shape with a hollow region formed along the longitudinal direction thereof is prepared (operation S100).

The insulating member 100, which is prepared in the insulating member preparation operation S100, is not limited as long as it is made of a material with insulating properties, and may be made of a glass material. Examples include at least one of borosilicate glass, silicon oxide, and aluminum silicon oxide.

The inner diameter of the insulating member 100 prepared in the insulating member preparation operation S100 is not limited as long as it is several to hundreds of μm, but may be 100 to 1000 μm for convenience so that it can be smoothly ruptured in the half-finished product manufacturing operation S400.

A conductive wire having a diameter equal to or less than the diameter of the hollow region formed along the longitudinal direction of the insulating member 100 is prepared (operation S200).

The conductive wire 200 prepared in the conductive wire preparation operation S200 is not limited as long as it is made of a conductive material.

However, in one or more examples, when a copper wire with a diameter of equal to or less than 25 μm is implemented as the conductive wire 200, a portion of the conductive wire 200 located on a ruptured surface of a half-finished product H manufactured in the half-finished product manufacturing operation S400 may be severely oxidized, causing a problem that an end of the conductive wire 200 where the oxidation occurred was crumbled.

Accordingly, the conductive wire 200 prepared in the conductive wire preparation operation S200 may be made of a material that has conductivity and at the same time has relatively superior oxidation resistance than copper.

For example, the conductive wire 200 prepared in the conductive wire preparation operation S200 may be made of a material that includes at least one of nickel (Ni) and chromium (Cr) and has relatively superior oxidation resistance than copper.

In an example, the conductive wire 200 prepared in the conductive wire preparation operation S200 is made of stainless steel including at least one of nickel (Ni) and chromium (Cr).

In an example, the conductive wire 200 prepared in the conductive wire preparation operation S200 may be made of austenitic stainless steel including nickel (Ni) and chromium (Cr). In an example, the conductive wire 200 prepared in the conductive wire preparation operation S200 may be made of either stainless steel 304 or stainless steel 316 including nickel (Ni) and chromium (Cr).

When the conductive wire 200 prepared in the conductive wire preparation operation S200 is made of stainless steel including nickel (Ni) and chromium (Cr), the conductive wire 200 located on the ruptured surface of the half-finished product H manufactured in the half-finished product manufacturing operation S400 may be prevented from being crumbled even when the diameter of the conductive wire 200 is equal to or less than 25 μm.

The conductive wire 200 prepared in the conductive wire preparation operation S200 may have a diameter equal to, or less than, the diameter of the hollow region formed along the longitudinal direction of the insulating member 100 prepared in the insulating member preparation operation S100, that is, the inner diameter of the insulating member 100, so that the conductive wire 200 is inserted into the hollow region of the insulating member 100 in the insertion operation S300.

Additionally, the lower limit of the diameter of the conductive wire 200 prepared in the conductive wire preparation operation S200 is not limited, but as the manufacture of the conductive wire 200 with a diameter of equal to or less than 10 μm is currently technically difficult, the diameter of the conductive wire 200 prepared in the conductive wire preparation operation S200 may exceed 10 μm.

The conductive wire 200 prepared in the conductive wire preparation operation S200 is inserted into the hollow region formed along the longitudinal direction of the insulating member 100 prepared in the insulating member preparation operation S100 (operation S300).

The insertion operation S300 may be an operation of inserting the conductive wire 200 into the hollow region formed in the insulating member 100 to obtain the insulating member 100 with the conductive wire 200 inserted into the hollow region. Accordingly, the insulating member 100 obtained in the insertion operation S300 may have the conductive wire 200 inserted therein along the longitudinal direction.

Heat and an external force may be applied to the insulating member 100 having the conductive wire 200 inserted therein in the insertion operation S300 to manufacture half-finished products H (S400).

The half-finished product manufacturing operation S400 may be an operation of manufacturing the half-finished products H by applying a tension force to the insulating member 100 having the conductive wire 200 inserted therein while heating the insulating member 100 having the conductive wire 200 inserted therein so that a central portion of the insulating member 100 is made relatively thinner than opposite ends thereof and the insulating member 100 and the conductive wire 200 are ruptured.

Each half-finished product H manufactured in the half-finished product manufacturing operation S400 has a ruptured surface on which a surface, that is, a surface made of a conductive material, of the conductive wire 200, is exposed.

The half-finished product manufacturing operation S400 may be an operation of manufacturing the half-finished products H by applying tension forces acting in opposite directions to the opposite ends of the insulating member 100 having the conductive wire 200 inserted therein while heating the insulating member 100 and the conductive wire 200 to stretch the central portion of the insulating member 100 having the conductive wire 200 inserted therein so that the central portion of the insulating member 100 is made thin and the insulating member 100 and the conductive wire 200 are ruptured at the central portions thereof.

In the half-finished product manufacturing operation S400, after making the central portion of the insulating member 100 thin by applying the tension forces acting in opposite directions to the opposite ends of the insulating member 100 having the conductive wire 200 inserted therein, the tension forces may be continuously applied to the opposite ends of the insulating member 100 while heating the central portions of the insulating member 100 and the conductive wire 200 using a laser so that the insulating member 100 and the conductive wire 200 are ruptured at the central portions thereof.

In manufacturing the half-finished products H in the half-finished product manufacturing operation S400, when the tension forces acting in opposite directions are applied to the opposite ends of the insulating member 100 having the conductive wire 200 inserted therein while heating the insulating member 100 and the conductive wire 200, an inner surface of the insulating member 100 and an outer surface of the conductive wire 200 are brought into close contact with each other.

Accordingly, the inner diameters of the insulating member 100 and the conductive wire 200 included in the ultra-micro electrode 10 manufactured in accordance with the one or more embodiments may correspond to each other.

The conductive wire 200 located on the ruptured surface of each half-finished product H manufactured in the half-finished product manufacturing operation S400 is etched to form a groove G having a predetermined depth (operation S600).

The etching operation S600 may be an operation of etching the conductive wire 200 so that the groove G with a predetermined depth is formed in a central portion of the ruptured surface of the half-finished product H manufactured in the half-finished product manufacturing operation S400.

In the etching operation S600, the groove G with a predetermined depth may be formed in the half-finished product H by etching the conductive wire 200 exposed on the ruptured surface of the half-finished product H manufactured in the half-finished product manufacturing operation S400 in the direction of a surface of the half-finished product H opposite to the ruptured surface.

In the etching operation S600, the groove G may be formed by etching the conductive wire 200 of the half-finished product H manufactured in the half-finished product manufacturing operation S400 using at least one method of wet etching, dry etching, and electrolytic etching, as only examples.

In an example, when etching the conductive wire 200 by electrolytic etching in the etching operation S600, the groove G may be formed in the half-finished product H by etching the conductive wire 200 in the following manner. First, an etching solution is prepared. Then, the half-finished product H obtained in the half-finished product manufacturing operation S400 is immersed in the prepared etching solution and then voltage is applied to the etching solution.

As a result of etching the conductive wire 200 in the etching operation S600, the conductive wire 200 may be provided in a shape in which the groove G with a predetermined depth is formed at an end of the insulating member 100.

The groove G of the half-finished product H formed in the etching operation S600 is filled with a conductive material to form the filling layer 300, thereby completing an ultra-micro electrode 10 (operation S700).

The filling operation S700 may be an operation of plating the half-finished product H obtained in the etching operation S600 and filling the groove G of the half-finished product H with the conductive material.

The filling operation S700 may be an operation of plating the half-finished product H obtained in the etching operation S600 to form the filling layer 300 in an area corresponding to the groove G of the half-finished product H.

In the filling operation S700, the filling layer 300 may be formed by filling the groove G of the half-finished product H with the conductive material using an electroplating method in which a plating solution containing ions of the conductive material is prepared, the half-finished product H is immersed in the plating solution, and voltage is applied to the plating solution. However, the one or more examples are not limited thereto. For example, the filling layer 300 may be formed using an electroless plating method in which a plating solution containing ions of the conductive material is prepared, the half-finished product H is immersed in the plating solution, and the conductive material is reduced using a reducing agent.

In the filling operation S700, the plating conditions, such as the composition of the plating solution, the intensity of the current applied to the plating solution, and the application time of the current applied to the plating solution may be changed as necessary to form a filling layer 300 having a micro-structure required by users. Accordingly, it is possible to manufacture an ultra-micro electrode 10 having a surface made of a conductive material and with a micro-structure required by users.

The filling operation S700 may include a plating solution preparation operation S710, an immersion operation S720, and a plating operation S730.

The plating solution preparation operation S710 may be an operation of preparing a plating solution for plating the half-finished product H obtained in the etching operation S600.

The plating solution preparation operation S710 may be an operation of preparing a plating solution containing ions of the conductive material to fill the groove G formed in the half-finished product H obtained in the etching operation S600.

The ions of the conductive material included in the plating solution prepared in the plating solution preparation operation S710 may be at least one of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), and lead (Pb) ions, but is not limited thereto, and may include any ions of a material that can be plated.

Since the ions of the conductive material included in the plating solution prepared in the filling operation S700 are at least one of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), and lead (Pb) ions, the filling layer 300 formed in the filling operation S700 may be made of any one selected from the group consisting of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), lead (Pb), and an alloy obtained by combining at least two of these metals.

In an example, when the filling layer 300 formed in the filling operation S700 is composed of an alloy, the filling layer 300 may be composed of an alloy of any one of copper (Cu)-nickel (Ni), tin (Sn)-silver (Ag), nickel (Ni)-iron (Fe), and nickel (Ni)-cobalt (Co), but is not limited thereto, and as described above, it may be composed of various alloys obtained by combining at least two of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), and lead (Pb).

The plating solution prepared in the plating solution preparation operation S710 may contain the ions of the conductive material to fill the groove G formed in the half-finished product H obtained in the etching operation S600, and, as necessary, it may further include organic/inorganic additives including at least one of a plating inhibitor, a plating accelerator, and a leveling agent.

The plating solution prepared in the plating solution preparation operation S710 may be one that is typically used in the field of plating technology. For example, when the conductive material for filling the groove G formed in the half-finished product H obtained in the etching operation S600 is copper, the plating solution prepared in the plating solution preparation operation S710 may be a plating solution that is prepared by mixing sulfuric acid, copper sulfate, and water, and contains copper ions.

When the conductive material for filling the groove G formed in the half-finished product H obtained in the etching operation S600 is nickel, the plating solution prepared in the plating solution preparation operation S710 may contain nickel sulfate hexahydrate (NiSO$_4$·6H$_2$O), nickel chloride hexahydrate (NiCl$_2$·6H$_2$O), boric acid (H$_3$BO$_3$), and sodium dodecyl sulfate (SDS) to contain nickel ions.

The immersion operation S720 may be an operation of immersing the half-finished product H obtained in the etching operation S600 in the plating solution prepared in the plating solution preparation operation S710.

The plating operation S730 may be an operation of plating the groove G of the half-finished product H immersed in the plating solution in the immersion operation S720 to form the filling layer 300 to complete the ultra-micro electrode 10.

In the plating operation S730, the filling layer 300 may be formed by plating the groove G of the half-finished product H by applying voltage to the plating solution in which the half-finished product H is immersed in the immersion operation S720.

When electric current is applied to the plating solution in the plating operation S730, the ions of the conductive material contained in the plating solution prepared in the plating solution preparation operation S710 may be reduced, so that an inner surface of the half-finished product H immersed in the immersion operation S720, the inner surface where the groove G is formed, may be plated. As a result, the filling layer 300 made of the conductive material may be formed in the groove G of the half-finished product H.

The method of manufacturing the ultra-micro electrode for electrochemical analysis according to the embodiment of the present disclosure may further include a first polishing operation S500 and a second polishing operation S800.

The first polishing operation S500 may be performed between the half-finished product manufacturing operation S400 and the etching operation S600. Since the half-finished product H obtained in the half-finished product manufacturing operation S400 is obtained by rupturing the insulating member 100 and the conductive wire 200, the ruptured surface thereof may be formed to be relatively uneven.

The first polishing operation S500 may be an operation of polishing the ruptured surface of the half-finished product H manufactured in the half-finished product manufacturing operation S400 so that the ruptured surface of the half-finished product H is made flat. When the ruptured surface of the half-finished product H is polished in the first polishing operation S500, the formation of the filling layer 300 can be performed more smoothly in the filling operation S700.

In the first polishing operation S500, the ruptured surface of the half-finished product H may be polished by a mechanical polishing method. However, the one or more examples are not limited thereto, and an ion milling method may be used. For example, the ruptured surface of the half-finished product H may be polished by an ion milling method using at least one of a focused ion beam (FIB) and a cross section polisher (CP).

The second polishing operation S800 may be performed after the filling operation S700.

The second polishing operation S800 may be an operation of polishing a surface of the ultra-micro electrode 10 manufactured in the filling operation S700, the surface where the filling layer 300 is formed.

When forming the filling layer 300 by plating in the filling operation S700, an unnecessarily plated portion W may be formed. Due to this unnecessarily plated portion W, when the ultra-micro electrode 10 is used as a probe tip or specimen for a scanning electrochemical microscope, electrochemical analysis may not be performed smoothly.

The second polishing operation S800 may be an operation of polishing the surface of the ultra-micro electrode 10 manufactured in the filling operation S700, the surface where the filling layer 300 is formed, to remove the unnecessarily plated portion W formed when forming the filling layer 300 by plating in the filling operation S700.

In the second polishing operation S800, the surface of the ultra-micro electrode 10 manufactured in the filling operation S700, the surface where the filling layer 300 is formed, may be polished by a mechanical polishing method and an electrochemical polishing method. In an example, the surface of the ultra-micro electrode 10 manufactured in the filling operation S700, the surface where the filling layer 300 is formed, may be polished by ion beam milling using a focused ion beam equipment.

Example 1

An insulating member 100 made of borosilicate glass, having an outer diameter of 1 mm, and having a capillary shape with a central hollow region with a diameter of 300 μm was prepared.

A conductive wire 200 made of stainless steel 304 was prepared, and the prepared conductive wire 200 was inserted into the hollow region of the insulating member 100. In an example, the diameter of the prepared conductive wire 200 was 11 μm.

While heating the insulating member 100 having the conductive wire 200 inserted therein using a laser puller (model name: P-2000, manufacturer: Sutter), tension forces were applied to make a central portion of the insulating member 100 thin. The central portions of the insulating member 100 and the conductive wire 200 were heated using a laser to cause the insulating member 100 and the conductive wire 200 to be ruptured at the central portions thereof. As a result, half-finished products H were manufactured.

A ruptured surface of each half-finished product H thus manufactured was polished by a milling method using a FIB.

The ruptured surface of the half-finished product H obtained after polishing was immersed in pyrophosphoric acid, an etching solution. After that, voltage was applied to the etching solution for 30 minutes so that the current density calculated according to the reaction area between the etching solution and the ruptured surface of the half-finished product H was 7.5 mA/cm². As a result of this operation, the conductive wire 200 located on the ruptured surface of the half-finished product H was etched to form a groove G with a depth of 4 μm.

A plating solution containing copper ions was prepared. Specifically, the plating solution was prepared by mixing copper sulfate pentahydrate, sulfuric acid, and water so that the concentrations of copper sulfate pentahydrate and sulfuric acid were 249.68 g/L and 98.08 g/L, respectively.

The half-finished product H in which the groove G was formed was immersed in the prepared plating solution, and then voltage was applied to the plating solution to fill the groove G formed in the half-finished product H, thereby forming a filling layer 300 made of copper.

Comparative Example 1

An insulating member 100 made of borosilicate glass, having an outer diameter of 1 mm, and having a capillary shape with a central hollow region with a diameter of 300 μm was prepared.

A conductive wire made of copper was prepared, and the prepared copper conductive wire was inserted into the hollow region of the insulating member 100. In an example, the diameter of the prepared copper conductive wire was 25 μm.

While heating the insulating member 100 having the conductive wire 200 inserted therein using a laser puller (model name: P-2000, manufacturer: Sutter), tension forces were applied to make a central portion of the insulating member 100 thin. The central portions of the insulating member 100 and the conductive wire 200 were heated using a laser to cause the insulating member 100 and the conductive wire 200 to be ruptured at the central portions thereof. As a result, half-finished products H were manufactured.

Test Example

In the Test Example, in order to confirm whether electrode manufacturing was performed smoothly according to Example 1, a half-finished product H and an ultra-micro electrode 10 manufactured according to Example 1 were analyzed using an optical microscope (OM), a scanning electron microscope (SEM), and an energy dispersive spectrometer (EDS). Additionally, a half-finished product H manufactured according to Comparative Example 1 was also analyzed using an optical microscope (OM).

Images obtained by OM analysis are illustrated in FIGS. 4 to 8, images obtained by SEM analysis are illustrated in FIGS. 9 to 12, and images obtained by EDS analysis are illustrated in FIGS. 13 to 16.

Figures 4, 5:
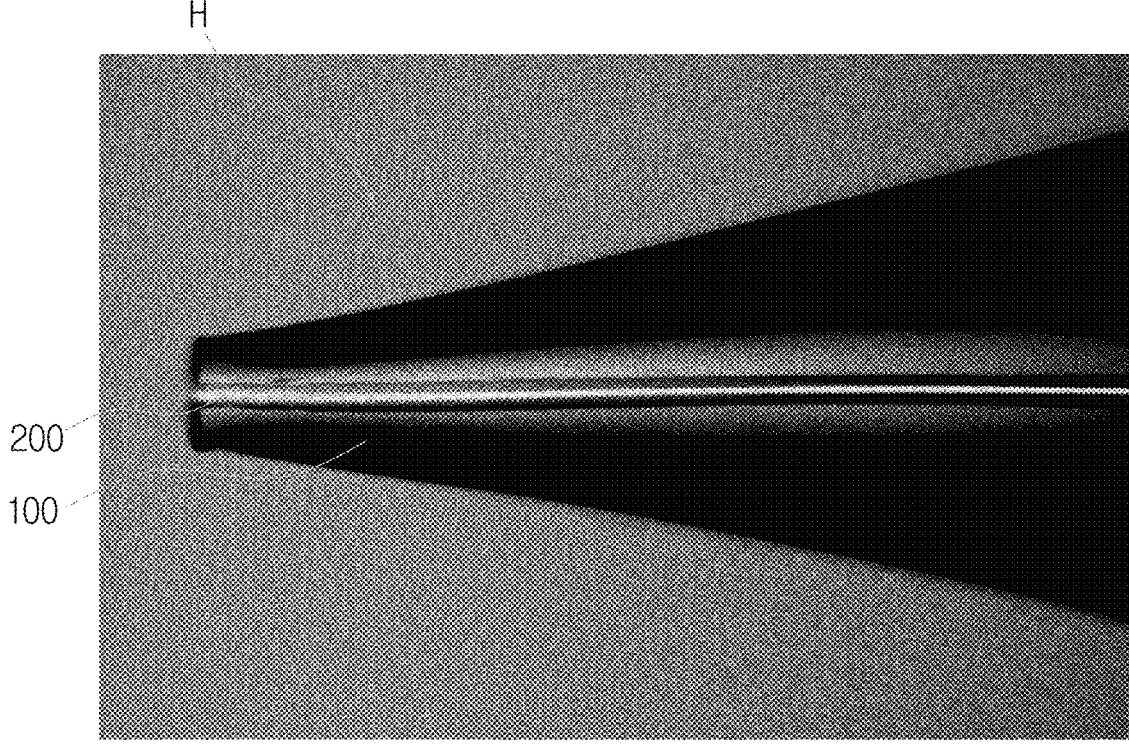
FIG. 4, FIG. 5, FIG. 6, FIG. 7, and FIG. 8 are images obtained by optical microscope analysis for test examples, in accordance with one or more embodiments.

FIG. 4 illustrates an OM image of the half-finished product H manufactured according to Example 1 by heating the central portion of the insulating member 100 having the conductive wire 200 inserted therein and rupturing the insulating member 100 and the conductive wire 200 at the central portions thereof.

FIG. 5 illustrates an OM image of the half-finished product H whose ruptured surface was polished by a milling method using a FIB.

Figure 6:
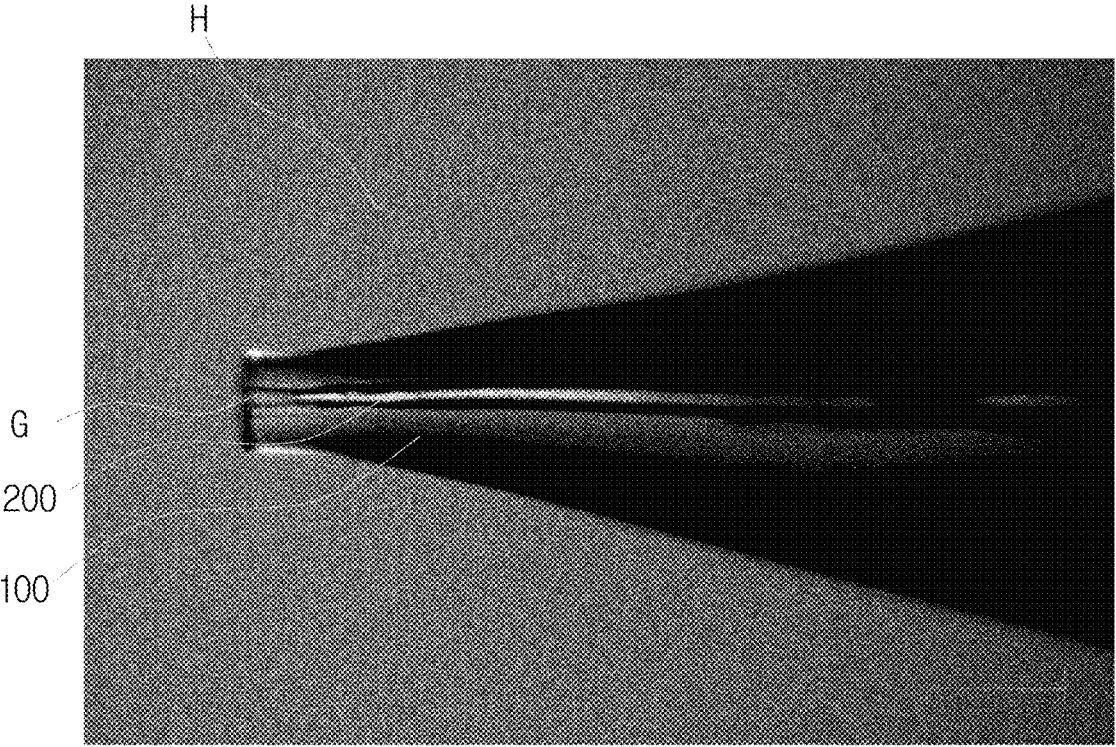

FIG. 6 illustrates an OM image of the half-finished product H after etching the conductive wire 200 located on the ruptured surface thereof.

Figure 7:
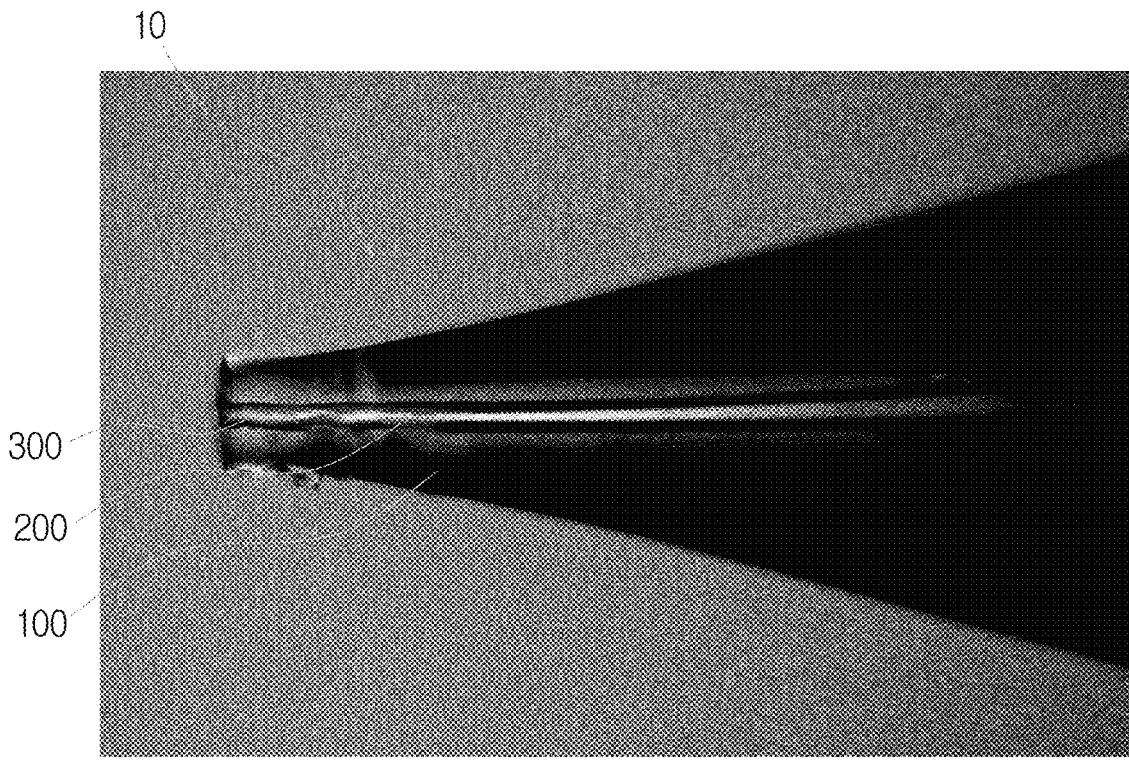

FIG. 7 illustrates an OM image of the ultra-micro electrode 10 in which the filling layer 300 was formed by filling the groove G formed in the half-finished product H.

Figure 8:
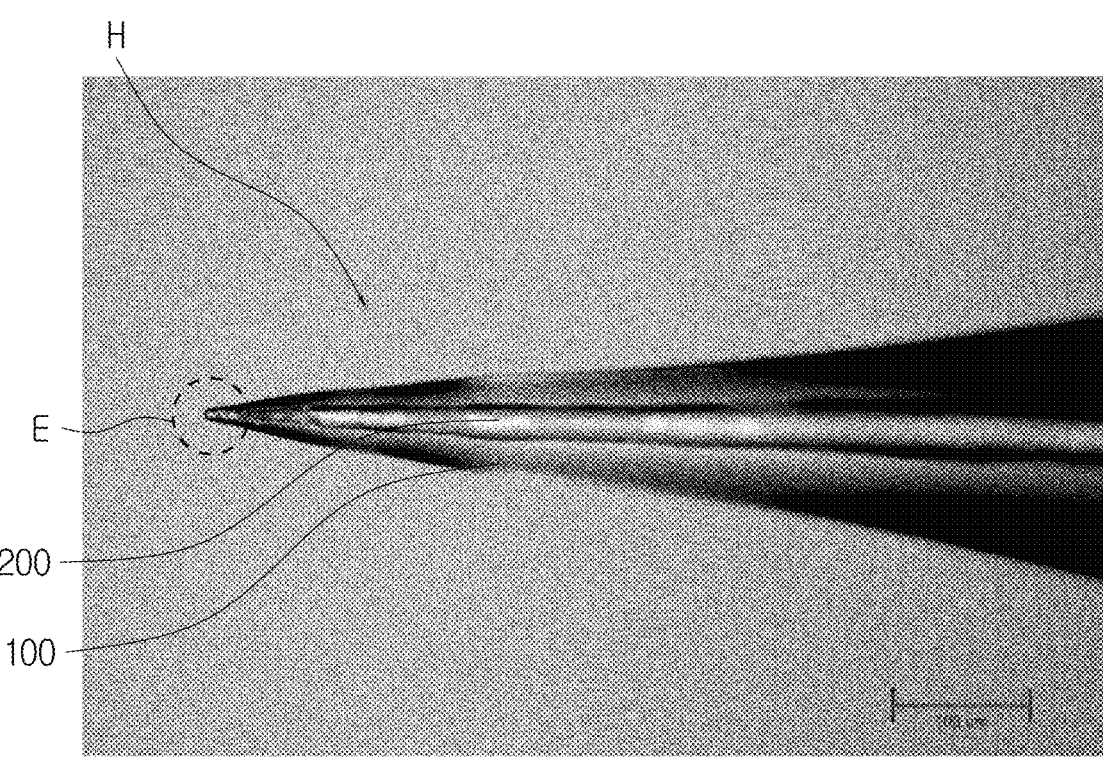

FIG. 8 illustrates an OM image of the half-finished product H manufactured according to Comparative Example 1.

Figure 9:
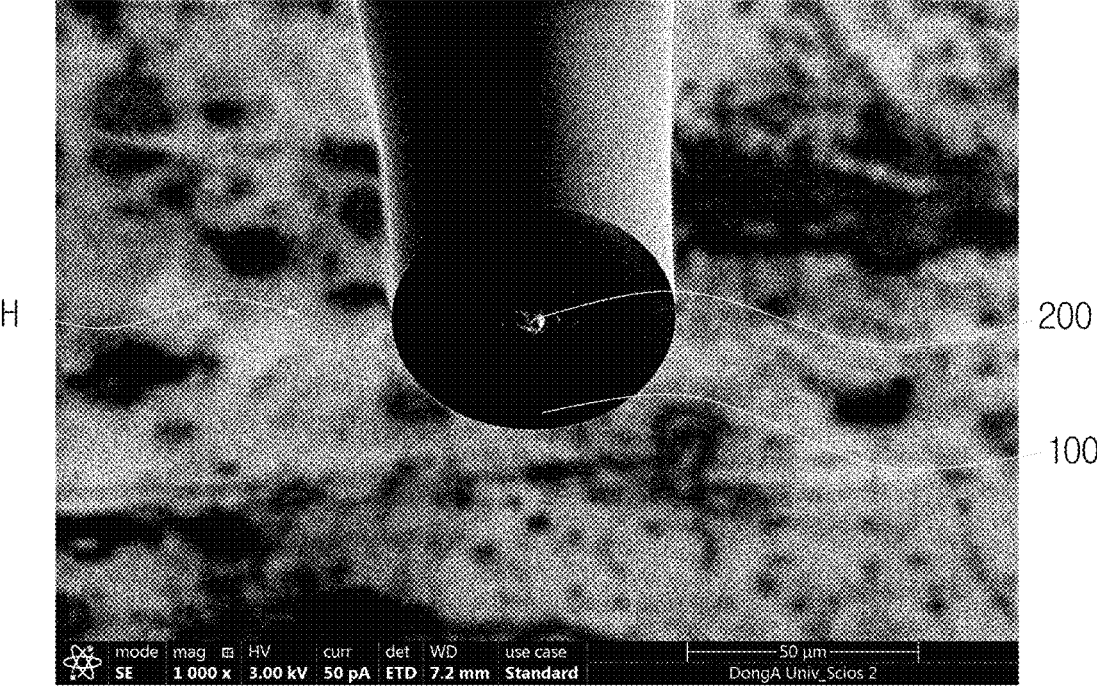
FIG. 9, FIG. 10, FIG., 11, and FIG. 12 are images obtained by scanning electron microscope analysis for the test examples, in accordance with one or more embodiments.

FIG. 9 illustrates an SEM image of the ruptured surface of the half-finished product H manufactured according to Example 1 by heating the central portion of the insulating member 100 having the conductive wire 200 inserted therein and rupturing the insulating member 100 and the conductive wire 200 at the central portions thereof.

Figure 10:
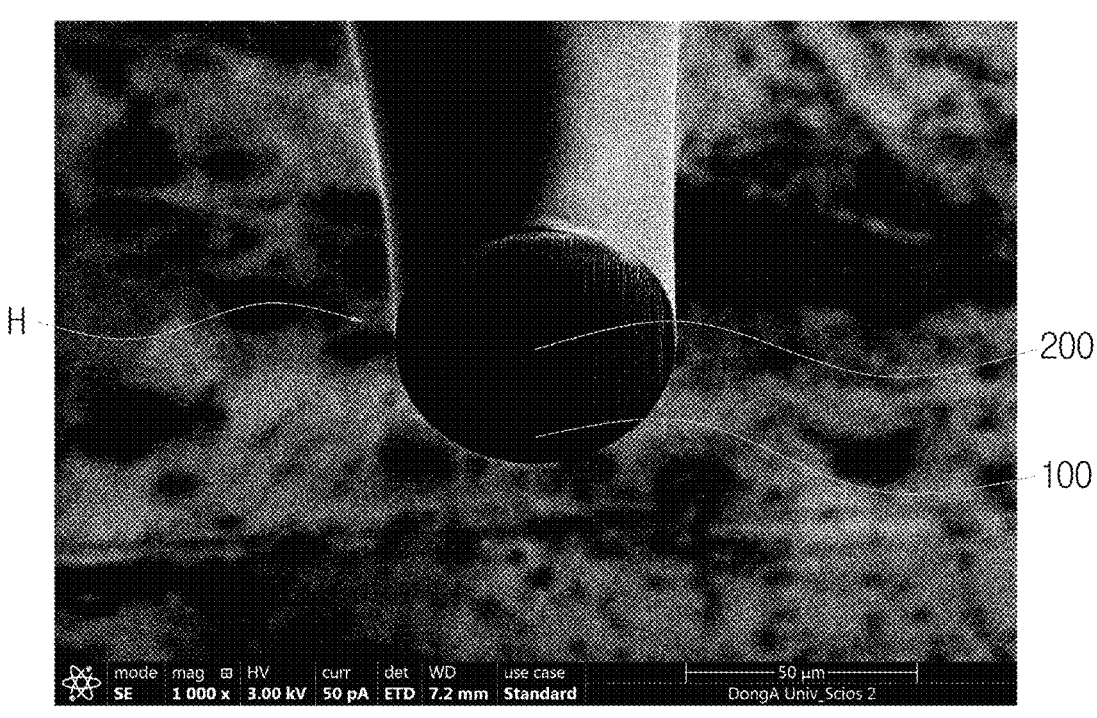

FIG. 10 illustrates an SEM image of the half-finished product H whose ruptured surface was polished by a milling method using a FIB.

Figure 11:
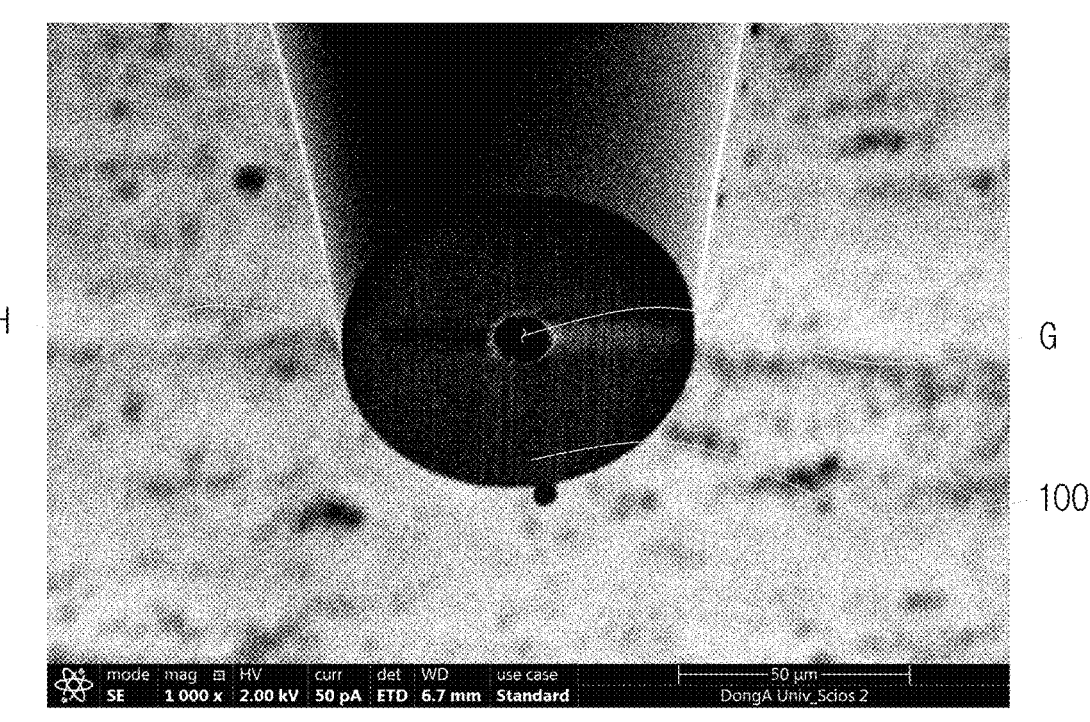

FIG. 11 illustrates an SEM image of the half-finished product H after etching the conductive wire 200 located on the ruptured surface thereof.

Figure 12:
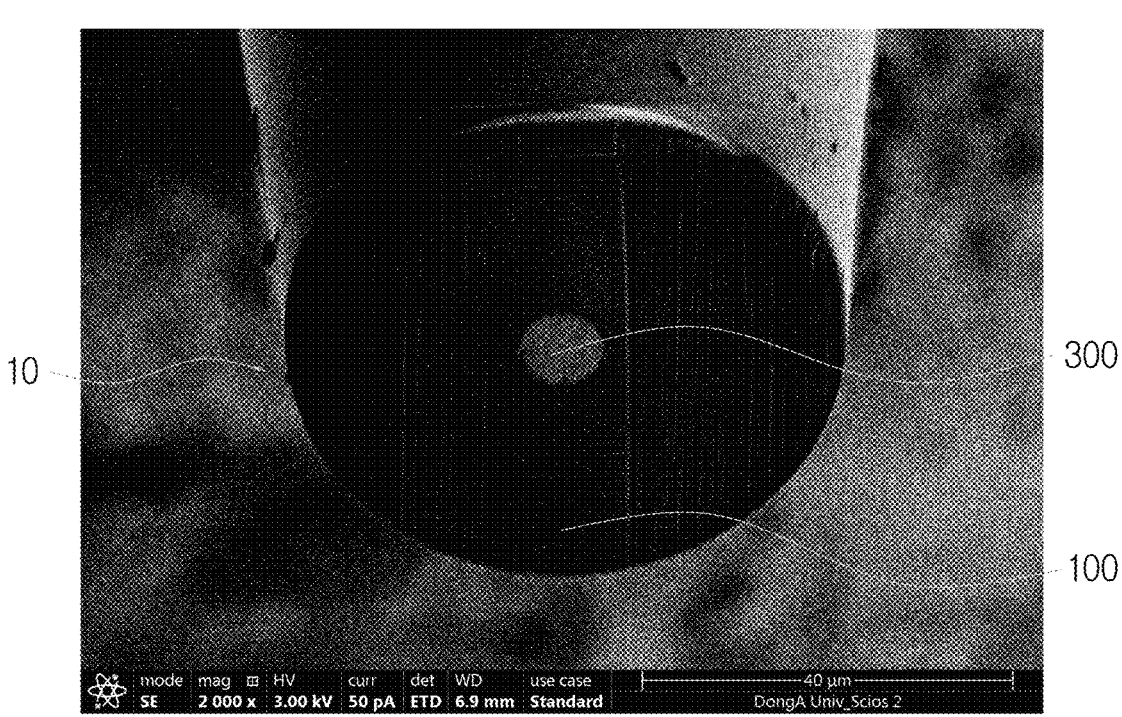

FIG. 12 illustrates an SEM image of the ultra-micro electrode 10 in which the filling layer 300 was formed by filling the groove G formed in the half-finished product H.

Figure 13:
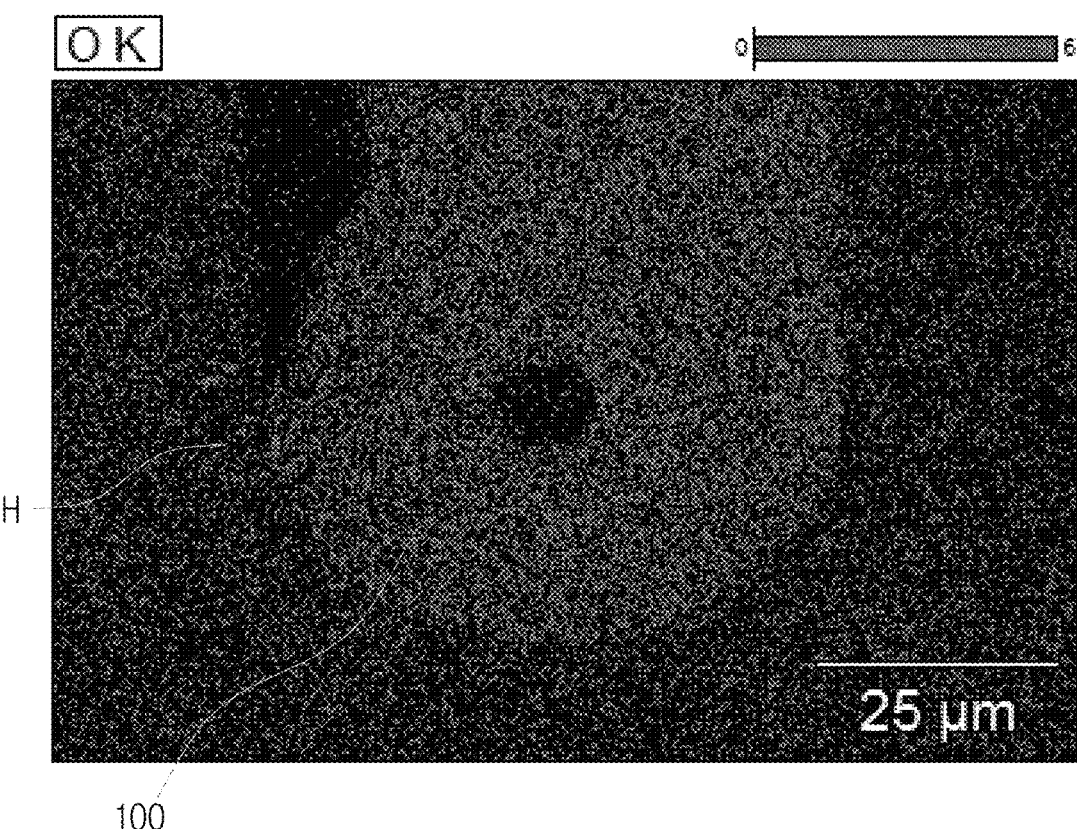
FIG. 13, FIG. 14, FIG. 15, and FIG. 16 are images obtained by energy dispersive spectrometer analysis for the test examples.

FIG. 13 illustrates an EDS image of the ruptured surface of the half-finished product H manufactured according to Example 1 by heating the central portion of the insulating member 100 having the conductive wire 200 inserted therein and rupturing the insulating member 100 and the conductive wire 200 at the central portions thereof.

Figure 14:
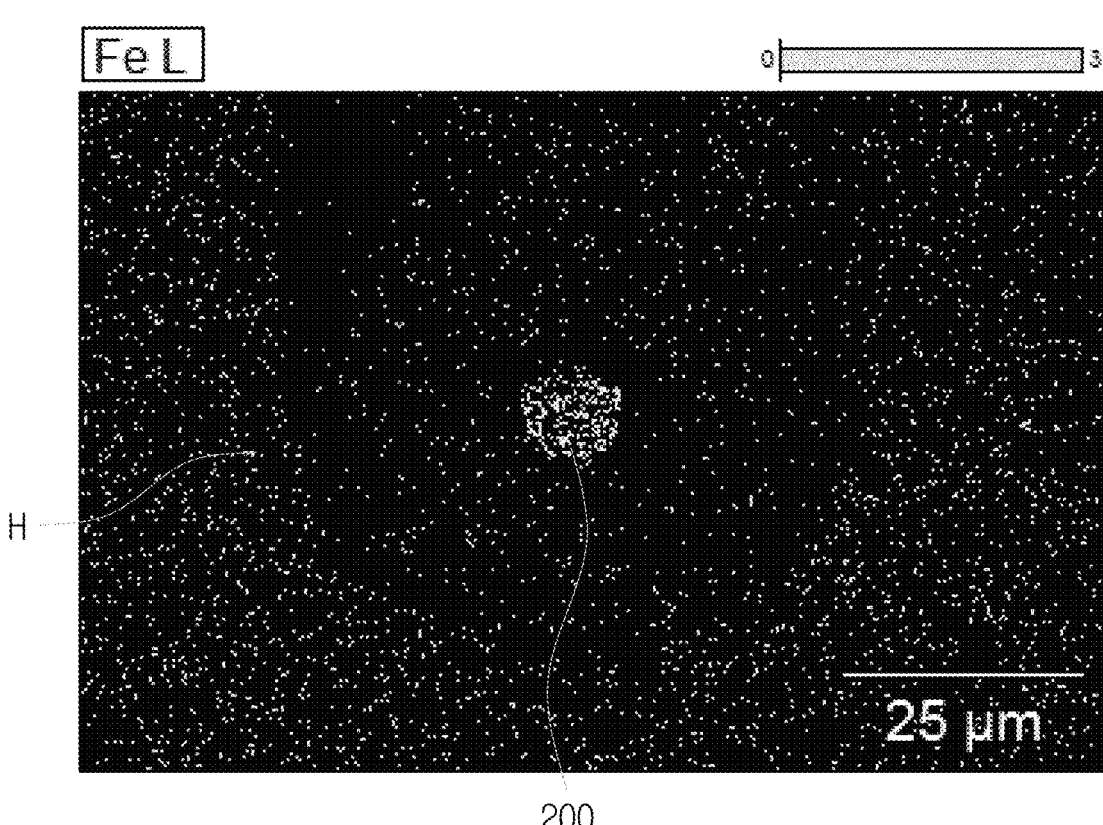

FIG. 14 illustrates an EDS image of the half-finished product H whose ruptured surface was polished by a milling method using a FIB.

Figure 15:
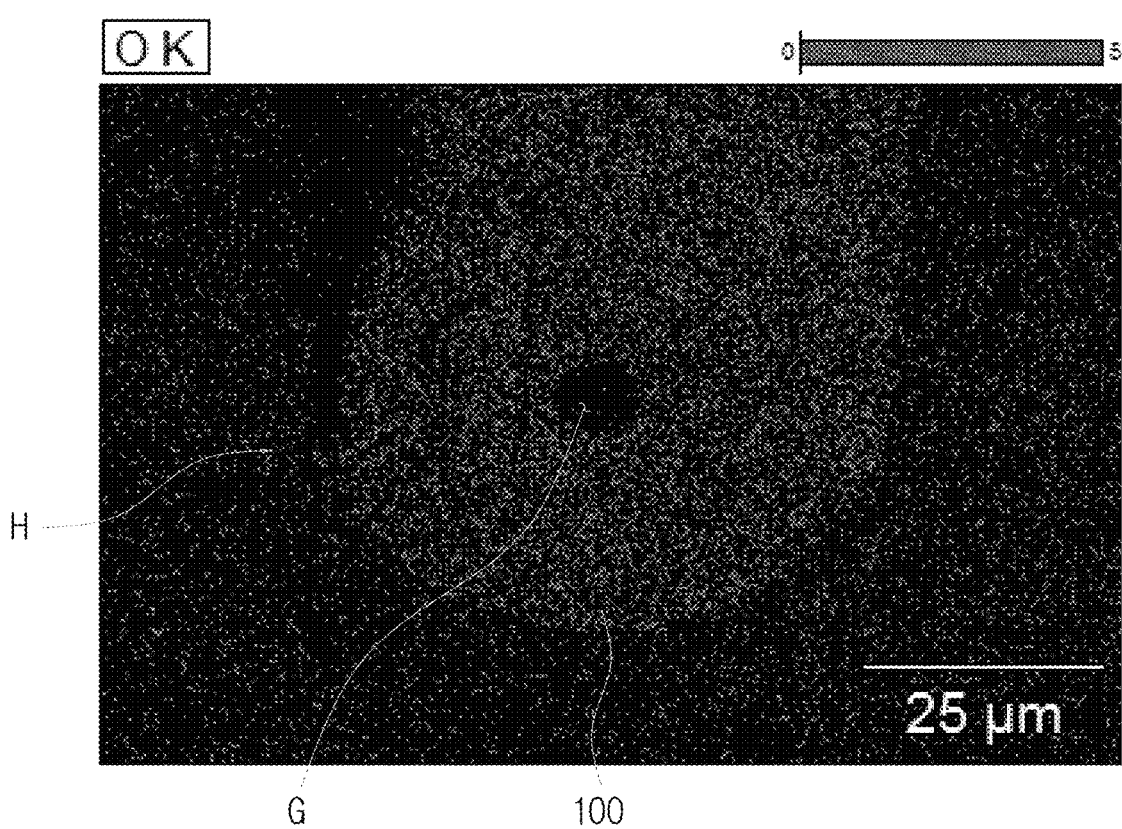

FIG. 15 illustrates an EDS image of the half-finished product H after etching the conductive wire 200 located on the ruptured surface thereof.

Figure 16:
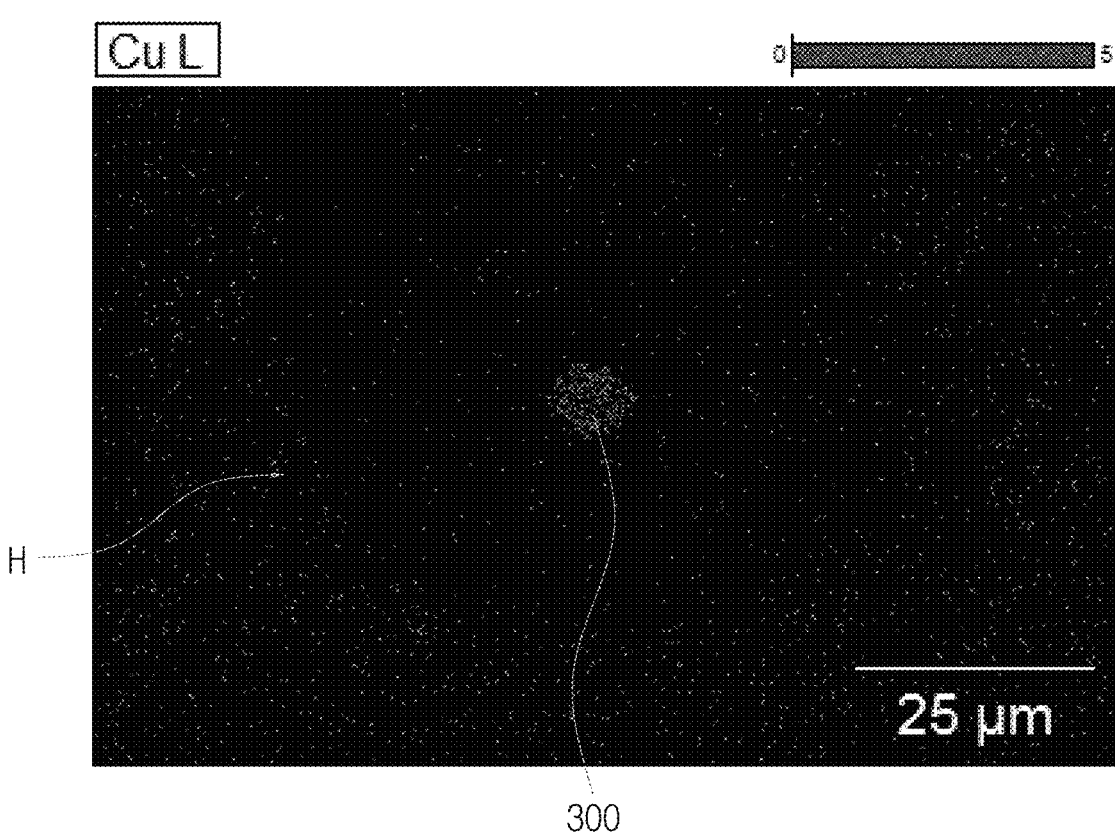
Figure 17:
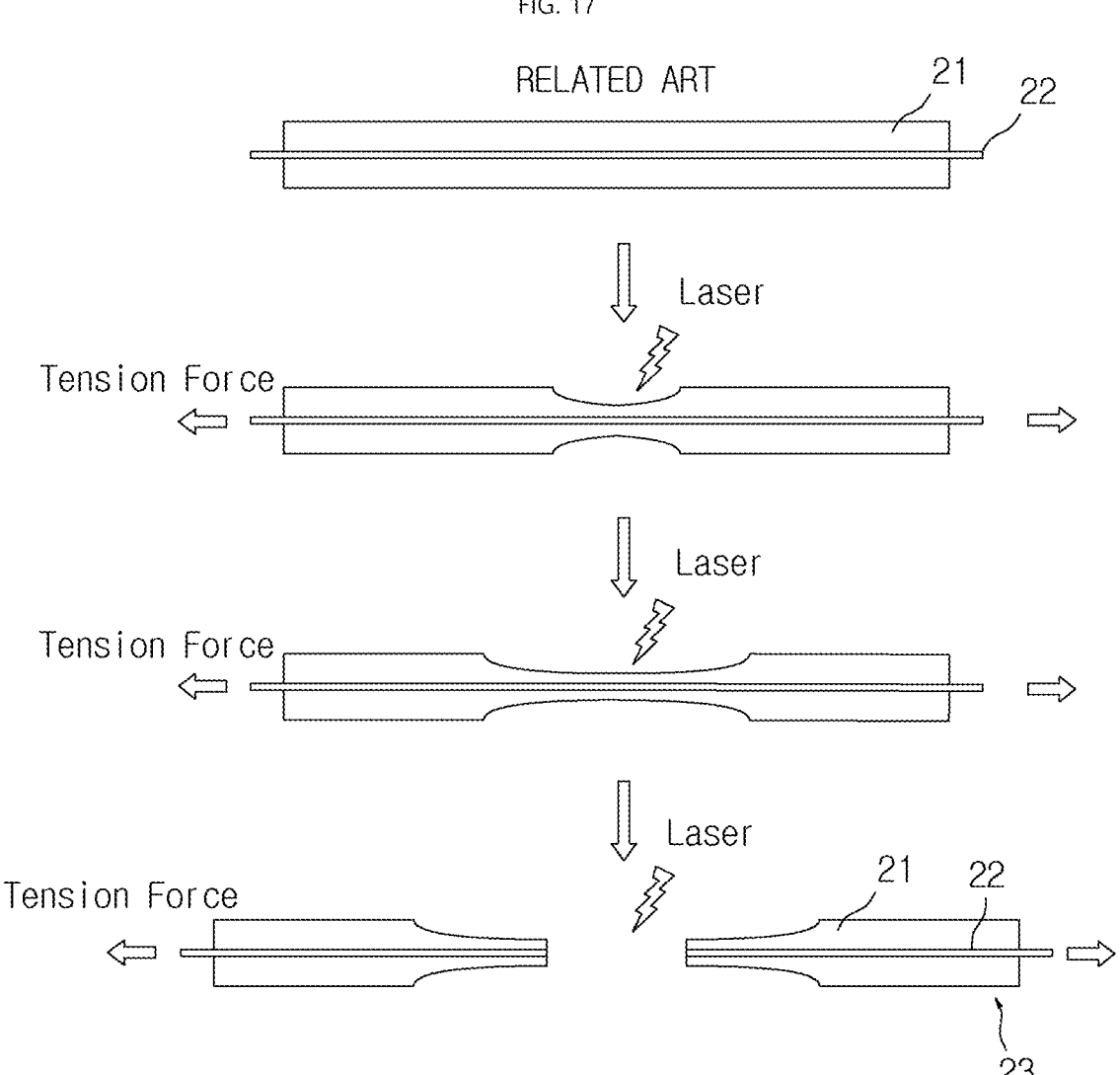
FIG. 17 is a view illustrating a method of manufacturing an example ultra-micro electrode, in accordance with one or more embodiments.

FIG. 16 illustrates an EDS image of the ultra-micro electrode 10 in which the filling layer 300 was formed by filling the groove G formed in the half-finished product H.

FIGS. 13 to 16 are images illustrating EDS mapping results for oxygen (O), iron (Fe), oxygen (O), and copper (Cu), respectively.

Referring to FIGS. 4 and 5, it can be confirmed that when applying the tension forces to make the central portion of the insulating member 100 having the conductive wire 200 inserted herein thin under application of heat and heating the insulating member 100 and the conductive wire 200 using a laser to cause the insulating member 100 and the conductive wire 200 to be ruptured at the central portions thereof, the half-finished product H having a micro-needle shape was manufactured smoothly.

Referring to FIGS. 6 and 11, it can be confirmed that the groove G was formed by etching conductive wire 200 located on the ruptured surface of the half-finished product H.

Referring to FIGS. 7 and 12, it can be confirmed that the filling layer 300 was successfully formed by filling the groove G of the half-finished product H with the conductive material.

Additionally, referring to FIGS. 14 and 15, it can be confirmed that the half-finished product H was manufactured smoothly when a conductive wire made of stainless steel was used as the conductive wire 200, and oxidation of the conductive wire 200 was prevented. Referring to FIG. 16, it can be confirmed that after the groove G was formed by etching the conductive wire 200, the filling layer 300 was successfully formed by filling the groove G of the half-finished product H with copper, the conductive material.

Lastly, referring to FIG. 8, when it can be confirmed that when the half-finished product H was manufactured using a conductive wire made of copper, oxidation of the conductive wire 200 located on the ruptured surface of the half-finished product H was significantly intensified, so that an end E of the conductive wire 200 where oxidation occurred was crumbled.

That is, referring to FIGS. 4 to 7 and 9 to 16, it can be confirmed that when using the method according to the one or more embodiments, the process of forming the groove G by etching the conductive wire 200 located on the ruptured surface of the half-finished product H and then filling the formed groove G with the conductive material could be carried out smoothly. This indicates that by using the method according to the one or more embodiments, it is possible to manufacture the ultra-micro electrode 10 by changing the type of conductive material constituting the filling layer 300 as necessary.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of manufacturing an ultra-micro electrode to perform electrochemical analysis, the method comprising:
    preparing an insulating member which has a capillary shape with a hollow region formed along a longitudinal direction thereof;
    preparing a conductive wire formed of a conductive material which has an oxidation resistance that is greater than an oxidation resistance of copper;
    inserting the conductive wire into the hollow region of the insulating member;
    manufacturing half-finished products by applying heat and an external force to the insulating member which has the conductive wire inserted therein to stretch the insulating member and the conductive wire so that a central portion of the insulating member is made thin and the insulating member and the conductive wire are ruptured at central portions thereof;
    forming a groove that has a predetermined depth by etching the conductive wire located on a ruptured surface of each half-finished product; and
    forming a filling layer by filling the groove with a conductive material by a plating process.

2. The method of claim 1, wherein the preparing of the conductive wire comprises forming the conductive wire with a material that contains at least one of nickel and chromium, and has an oxidation resistance that is greater than an oxidation resistance of copper.

3. The method of claim 2, wherein the preparing of the conductive wire comprises forming the conductive wire with stainless steel containing at least one of nickel and chromium.

4. The method of claim 1, wherein the preparing of the conductive wire comprises forming the conductive wire with a diameter that is greater than 0 μm and less than an inner diameter of the insulating member.

5. The method of claim 1, wherein the diameter of the conductive wire is equal to or less than 25 μm.

6. The method of claim 1, wherein the forming of the filling layer comprises:
    preparing a plating solution;
    immersing each of the half-finished products in the plating solution; and
    performing the plating process to form the filling layer inside the groove of each of the half-finished products.

7. The method of claim 6, wherein the performing of the plating process forms the filling layer by applying a voltage to the plating solution in which each of the half-finished products is immersed so that an inner surface of the half-finished product where the groove is formed is plated.

8. The method of claim 6, further comprising:

polishing the ruptured surface of the half-finished product after the manufacturing of the half-finished product and before the forming of the groove; and polishing a surface of the manufactured ultra-micro electrode where the filling layer is formed after the performing of the plating process.

9. The method of claim 6, wherein the preparing of the plating solution is performed by prepare the plating solution to contain ions of the conductive material including at least one of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), and lead (Pb).

10. The method of claim 1, wherein the insulating member is prepared to comprise at least one of borosilicate glass, silicon oxide, silicon nitride, and quartz.

11. An ultra-micro electrode that preforms electrochemical analysis, the ultra-micro electrode comprising:

an insulating member which has a capillary shape with a hollow region formed along a longitudinal direction thereof;

a conductive wire formed of a conductive material which has an oxidation resistance that is greater than an oxidation resistance of copper, and inserted into the hollow region to form a groove with a predetermined depth at an end of the insulating member; and a filling layer formed in an area corresponding to the groove, and formed at the end of the insulating member, wherein the filling layer is formed with a conductive material.

12. The ultra-micro electrode of claim 11, wherein the filling layer is comprised of any one of copper (Cu), nickel (Ni), tin (Sn), aluminum (Al), iron (Fe), cobalt (Co), and zinc (Zn), zirconium (Zr), chromium (Cr), palladium (Pd), silver (Ag), indium (In), lead (Pb), and an alloy obtained by combining at least two of these metals.

\* \* \* \* \*